United States Patent [19]
La Cour et al.

[11] Patent Number: 5,775,771
[45] Date of Patent: Jul. 7, 1998

[54] CHILD RESTRAINING SEAT FOR VEHICLE

[76] Inventors: Cynthia M. La Cour, 6670 Obispo Ave., Apt. 609, Long Beach, Calif. 90805; Lynette M. Richards, 4873 Magnus Way, San Diego, Calif. 92113

[21] Appl. No.: 692,370

[22] Filed: Aug. 5, 1996

[51] Int. Cl.⁶ ............................................. B60N 2/14
[52] U.S. Cl. ............... 297/238; 297/217.4; 297/188.04; 297/188.11
[58] Field of Search ................. 297/238, 217.3, 297/217.4, 216.11, 467, 188.01, 188.04, 188.11

[56] References Cited

U.S. PATENT DOCUMENTS

| | | | |
|---|---|---|---|
| D. 180,542 | 7/1957 | Barrow | 297/188.11 X |
| 2,851,084 | 9/1958 | Benjetsky | 297/467 X |
| 3,992,028 | 11/1976 | Abe et al. | 280/728 |
| 4,540,216 | 9/1985 | Hassel, Sr. | 297/238 |
| 4,834,420 | 5/1989 | Sankrithi et al. | 280/728 |
| 4,936,627 | 6/1990 | Guim | 297/238 |
| 4,943,112 | 7/1990 | Law | 297/238 |
| 5,100,199 | 3/1992 | Vander Stel et al. | 297/238 |
| 5,106,158 | 4/1992 | Dukatz et al. | 297/238 X |
| 5,161,855 | 11/1992 | Harmon | 297/238 |
| 5,177,616 | 1/1993 | Riday | 297/217.3 X |
| 5,179,447 | 1/1993 | Lain | 297/217.3 X |
| 5,385,384 | 1/1995 | Gierman et al. | 297/238 |
| 5,511,850 | 4/1996 | Coursey | 297/216.11 |
| 5,527,093 | 6/1996 | Park | 297/238 |

*Primary Examiner*—Peter M. Cuomo
*Assistant Examiner*—Stephen Vu
*Attorney, Agent, or Firm*—Brown, Martin, Haller & McClain, LLP

[57] ABSTRACT

A child safety seat designed for permanent installation in a vehicle seat has a seat portion and a backrest portion. A pivot device projects from the seat for pivotally mounting the seat in a cut-out in the backrest of a vehicle seat, and the safety seat can be rotated between an upright position where the backrest portion is flush with the vehicle seat backrest, and a retracted position in which the seat portion is flush with the vehicle seat backrest. An air bag and air bag actuator is mounted on a column at the forward end of the seat, and the air bag actuator is connected to the air bag trigger circuit of the vehicle electrical system so that the safety seat air bag will be inflated in the event that the vehicle driver air bag is inflated.

9 Claims, 3 Drawing Sheets

5,775,771

CHILD RESTRAINING SEAT FOR VEHICLE

BACKGROUND OF THE INVENTION

This invention relates to child and infant seats for vehicles, and is particularly concerned with a retractable child restraining seat built into a conventional seat of an automobile or passenger van.

Several types of restraining seats for children under about 4 years of age or 40 lbs in weight are in use today. Such seats are typically fastened into the rear seats of vehicles using the existing conventional seat belts, and have their own belts or restraining bars for holding the child in the event of sudden stops or impacts.

In U.S. Pat. No. 4,936,627 of Guim, a vehicle seat with a built-in, retractable child seat is described, in which the child seat is supported by a rail assembly which allows it to be slidable retracted, and is pivotally mounted to structural elements within the seat so that it can be pivotally retracted when not in use. U.S. Pat. Nos. 5,161,855 of Harmon and 4,943,112 of Law also describe child restraining seats which are built into conventional adult seats. These have seat cushions which are pivoted out of the way into an upright position flush with the seat back when not in use.

U.S. Pat. No. 4,834,420 of Sankrithi et al. describes a child seat or accommodating device which is secured in a vehicle seat via the existing seat belts. The seat has in-built accident sensing means and air bag, with an air bag inflation means operated by the accident sensing means.

SUMMARY OF THE INVENTION

It is an object of the present invention to provide a new and improved child restraining seat for a vehicle.

According to the present invention, a child restraining seat device is provided which comprises a seat frame having a seat portion and a rearwardly reclining backrest portion, pivot means for pivotally securing the seat frame to the rear seat of a vehicle for pivoting between an upright, deployed position and a rearwardly pivoted, retracted position in which the seat portion is upright and flush with the backrest portion of the vehicle seat, a restraining strap assembly for holding the child in the seat, the seat portion having an upright column at its outer end, an inflatable air bag mounted in said column, an air bag actuator device for inflating the air bag, and a connecting line extending through the seat for connection to the trigger circuit of an air bag system of the vehicle, so that the child seat air bag is deployed whenever the vehicle driver air bag is deployed.

With this device, the child's air bag will only be deployed in the event of a collision which triggers the driver's air bag, reducing the risk of accidental deployment of the child's air bag in the event of a sudden stop, for example. Preferably, the air bag is shaped and dimensioned such that it will not cover the child's face when deployed. In a preferred embodiment of the invention, the upright column comprises a central post at a forward edge of the seat portion, which will be straddled by a child's legs when in the seat. The central post is slidable inwardly and outwardly for easy loading of the child in the seat, and a locking mechanism is provided for releasably locking the post in the inward position. An extendable tube extends through the post and seat portion of the frame for carrying the wiring for connection of the air bag actuator or gas generator to the vehicle air bag triggering circuit.

An infant seat for accommodating a small baby may be provided for releasably mounting in the seat frame when needed. This seat uses the existing restraining belts and will hold the baby in a position so that air bag deployment with restrain the baby but not cover the infant's face.

Preferably, a sliding tray is provided beneath the frame portion of the seat. The tray may have one or more insulated compartments for holding food or drinks for the infant or toddler.

The seat is mounted in a suitable recess or cut-out region provided in the seat back of a vehicle rear seat, preferably in the center of the vehicle seat. A cushion is provided on the underside of the seat portion of the frame, and the cushion fills the recess when the child seat is retracted to provide a backrest for adults or older children. A top cover panel is provided to cover the top of the recess when the child seat is retracted. The cover panel is pivoted upwardly out of the way when the child seat is in use, and may have pockets, hanger hooks, compartments or the like which are exposed in the upwardly pivoted position for holding various accessories such as diapers, toys and the like.

The child restraining seat of this invention is quick and easy to use, and is in-built into an existing car seat for easy deployment when needed. It provides an air bag for additional protection in the event of a collision. Convenient storage places for food, drinks and other accessories are provided.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENTS

Figure 1:
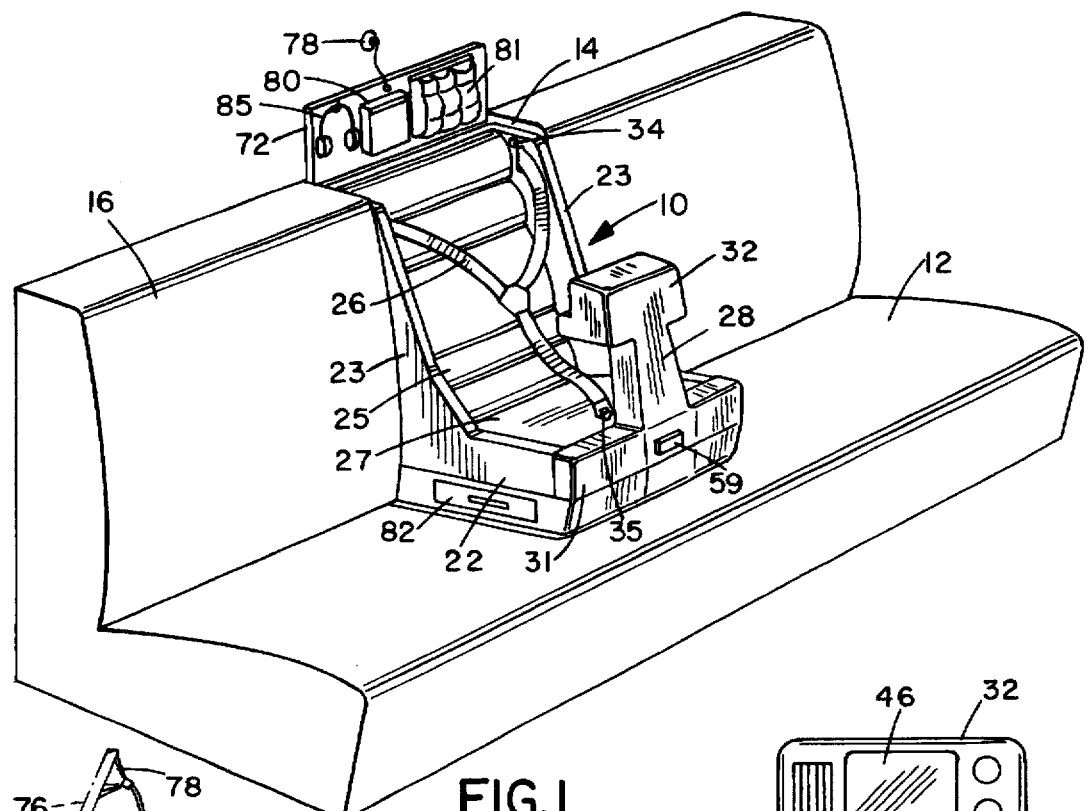
FIG. 1 is a perspective view of the safety seat according to a preferred embodiment of the invention incorporated in a typical vehicle seat.
Figure 2:
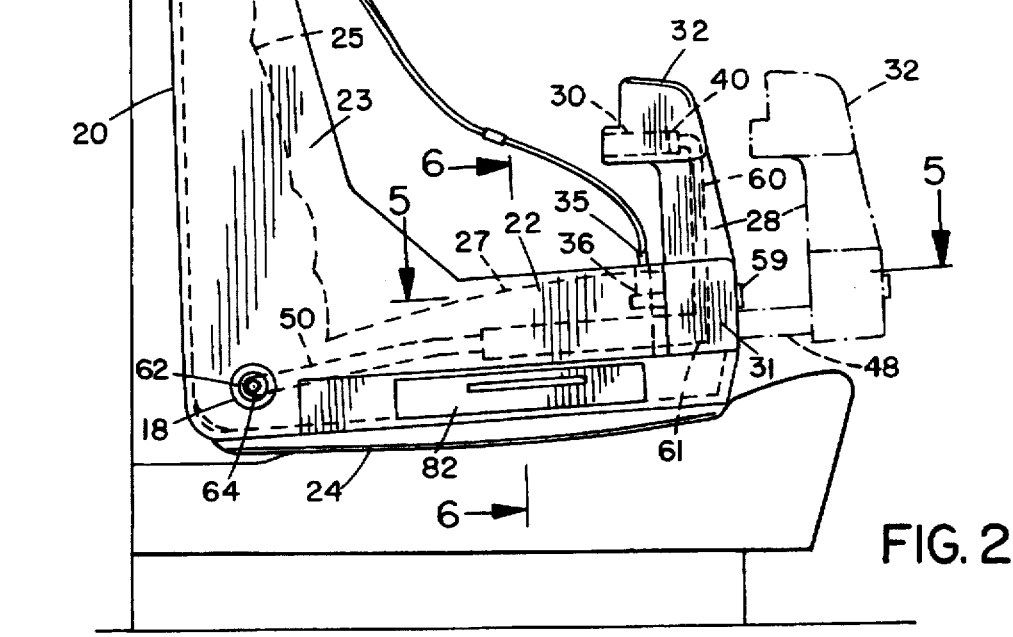
FIG. 2 is a side elevation view of the seat assembly.

FIGS. 1 and 2 of the drawings illustrate a child safety seat 10 according to a preferred embodiment of the invention installed in a rear seat 12 of a vehicle such as an automobile having a standard driver side air bag and air bag actuation system (not illustrated). The seat 10 has a plastic shell or frame having an upright or backrest portion 20 and a base or bottom portion 22, with side walls 23 extending along opposite sides of the seat, and seat cushions 25,27 installed in the backrest and seat portions, respectively. The seat 10 has an upright column 28 at the forward end of seat portion 22, and an air bag device 30 is provided in an enlarged portion 32 at the upper end of column 28.

The seat is installed in a suitably dimensioned cutout area 14 in the back 16 of rear bench seat 12, and is pivotally mounted in the seat frame via tubular axle member 18 which extends through the safety seat 10 at the junction between the seat back 20 and seat bottom 22 and through the entire seat frame of the rear bench seat 12 for rotational connection to the side walls of the vehicle. The child safety seat 10 is secured to rotationally mounted tubular axle member 18 so that the seat can be pivoted between the upright, deployed position illustrated in FIGS. 1 and 2 and the retracted, rearwardly rotated position of FIG. 4 in which the seat is pivoted backwards until the bottom portion 22 is upright and flush with the seat back 16. Preferably, padding 24 is provided on the undersurface of the bottom portion 22 of the seat 10 and this is designed to follow the contour of the vehicle seat back cushion to form a continuous padded support surface for persons in the back seat when the child safety seat is not in use. A suitable locking mechanism is provided to hold the seat in the upright position. In the illustrated embodiment, the locking mechanism comprises latch members 34 installed in the side walls 23 for releasable locking engagement in corresponding bores in the sides of cut-out area 14 of the vehicle seat when the child safety seat is in the upright position, as illustrated in FIG. 1. Similar latch pins (not illustrated) will be provided in the side walls adjacent the forward end of the seat for engagement in the same bores in the sides of cut-out 14 when the seat is retracted into the position illustrated in FIG. 3.

The backrest 20 will be rearwardly inclined when the seat is deployed so as to hold a child in the optimum position. A Y-shaped restraining strap 26 is provided for holding the child in the seat. The strap 26 has a locking catch 35 at its free end for locking engagement in a conventional seat belt locking mechanism 36 in the bottom portion of the seat at a location which will be between a child's legs when seated in the seat.

Figure 3:
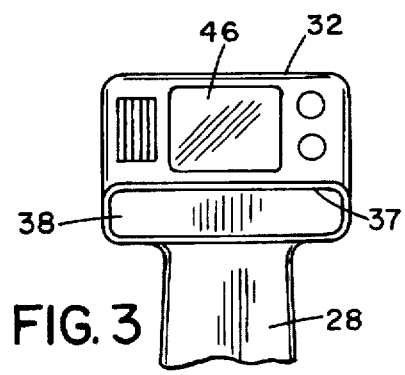
FIG. 3 is an enlarged face view of the air bag head on the safety seat column.

The air bag device 30 comprises an inflatable air bag positioned in the upper portion 32 of column 28 in a location facing opening 37. A hinged lid 38 is secured over opening 37 and is adapted to be blown open in the event that air bag 30 inflates. The air bag is associated with a conventional gas generator 40. The enlarged housing or upper end portion 32 of the housing may also be provided with an in-built miniature TV set 46 facing the occupant of the safety seat 10, as illustrated in FIG. 3, for entertainment purposes.

Figure 5:
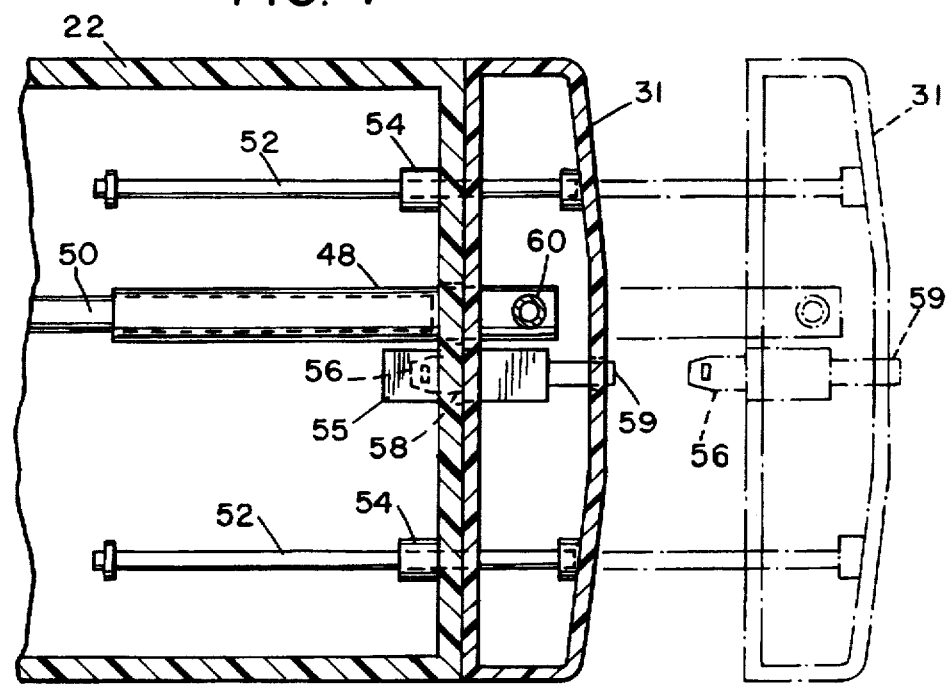
FIG. 5 is an enlarged sectional view taken on line 5—5 of FIG. 2.

The column 28 is movably mounted on the base 22 of the seat frame so that it can be moved away from the seat frame into an extended position, as illustrated in dotted outline in FIG. 2, to allow a child to enter or exit the seat more easily. Preferably, as best illustrated in FIG. 5, the lower end portion 31 of column 30 has a tubular member 48 projecting forwardly into the base or bottom 22 of the seat and engaging telescopically over tubular sleeve 50 in the seat base. Guide rods 52 on each side of member 48 also project from base 31 through guides 54 in the seat base for alignment purposes. This allows the base 31 to slide inwardly and outwardly between the fully extended position illustrated in dotted outline and the retracted position illustrated in solid outline in FIGS. 2 and 5. A suitable latching mechanism 55 is provided for releasably locking the base 31 in the retracted position. Preferably, mechanism 55 is of the standard seat belt latch type having a latch member 56 projecting from base 31 for engagement in a latch slot 58 on the bottom of the seat, and releasable via suitable release button 59.

A wiring guide channel or sleeve 60 extends downwardly from gas generator 40 through the column 28 and connects to tubular member 48 at junction 61. Tubular sleeve 50 extends from member 48 and into the axle member 18 where it is connected to a co-axial center tube member 62 extending along the center of axle member 18. This provides a continuous protective casing for electrical wiring 64 extending from gas generator 40 through channel 60, member 48, and sleeve 50 into inner tubular member 62 and along the center of axle member 18. The wiring 64 is then connected into the standard electrical wiring system of the vehicle and via the wiring system into the actuator circuit for the driver side air bag of the vehicle. Thus, in the event of an accident which actuates the driver's side air bag of the vehicle, the child seat air bag will also be automatically actuated.

Preferably, an optional infant seat insert 66 is provided for the child safety seat 10, to allow small babies to be supported safely in the seat. The infant seat insert 66 will have a conventional restraining strap and latch mechanism (not illustrated) similar to that of the seat 10, and will be releasably connected to the seat 10 via releasable screws or the like (not illustrated).

The air bag 30 is preferably dimensioned so that, when deployed, it will not cover the face of an infant in insert 66 or child in seat 10, but will safely cushion the infant or child from the effects of a collision without risk of smothering the child.

Figure 4:
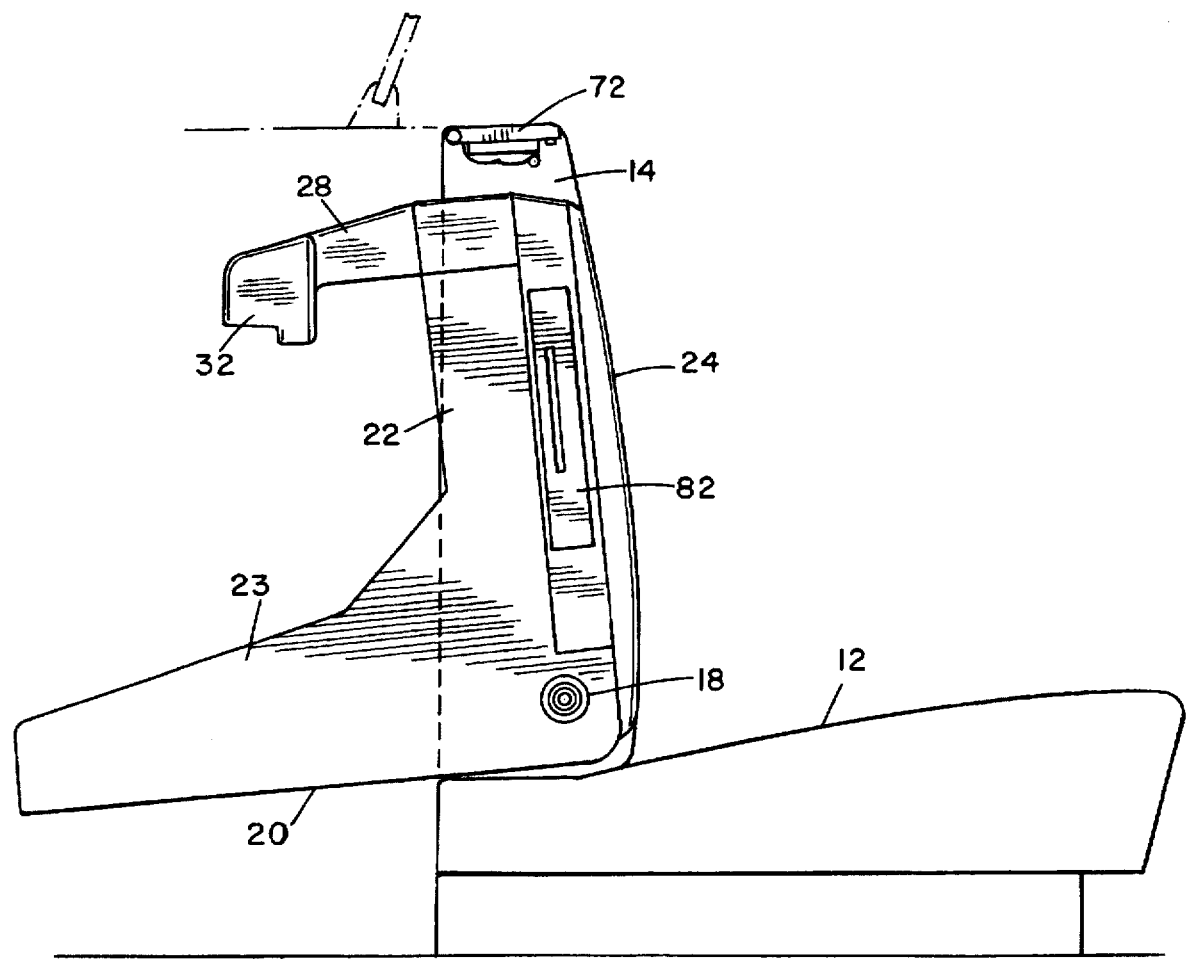
FIG. 4 is a side elevation view with the safety seat retracted into the vehicle seat back.

The seat 10 is provided with a number of accessories for convenience when travelling with a small child or infant. A cover flap 72 is hinged via hinges 74 to the backrest portion 20 of the seat frame at the upper end of the frame, and may be secured to the vehicle back window 76 via suction cup 78 when the seat is in the upright, deployed position, as illustrated in FIGS. 1 and 2. When the seat is rotated back out of the way when not needed, the cover flap is pivoted down to cover the upper end of the bottom portion of the seat, as illustrated in FIG. 4. The flap 72 will be flush with the top of the vehicle seat back 16 and acts as a closure panel for the stowed seat. Storage pockets 80,81 are provided on the inner face of the flap. Various accessories such as diapers, bottles, toys, disposable bags for used diapers, and the like may be stored in pockets 80 and 81. The flap 72 also acts as a shade device when upright as in FIGS. 1 and 2, shading the child's head against sunlight through the rear window of the vehicle. Headphones 85 may be stored on flap 72 for use by the child when watching a video or television program without disturbing the other occupants of the vehicle. These will be electrically connected to the TV unit via suitable retractable wiring extending through the body of the seat. A removable potty 79 may also be installed in a compartment below a suitable lid in the seat portion 22 for use by the child while travelling.

Figure 6:
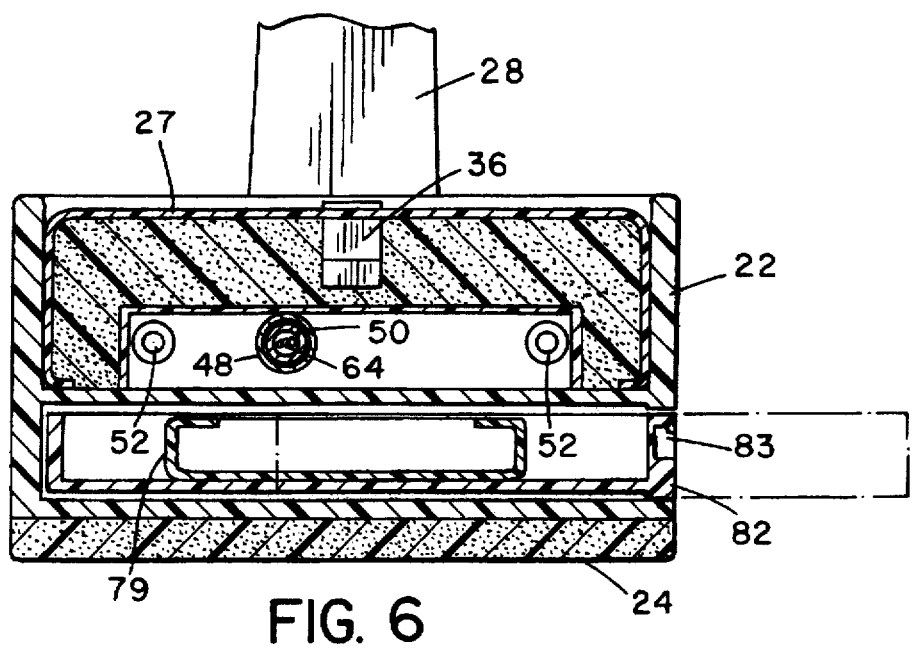
FIG. 6 is an enlarged sectional view taken on line 6—6 of FIG. 2.
Figure 7:
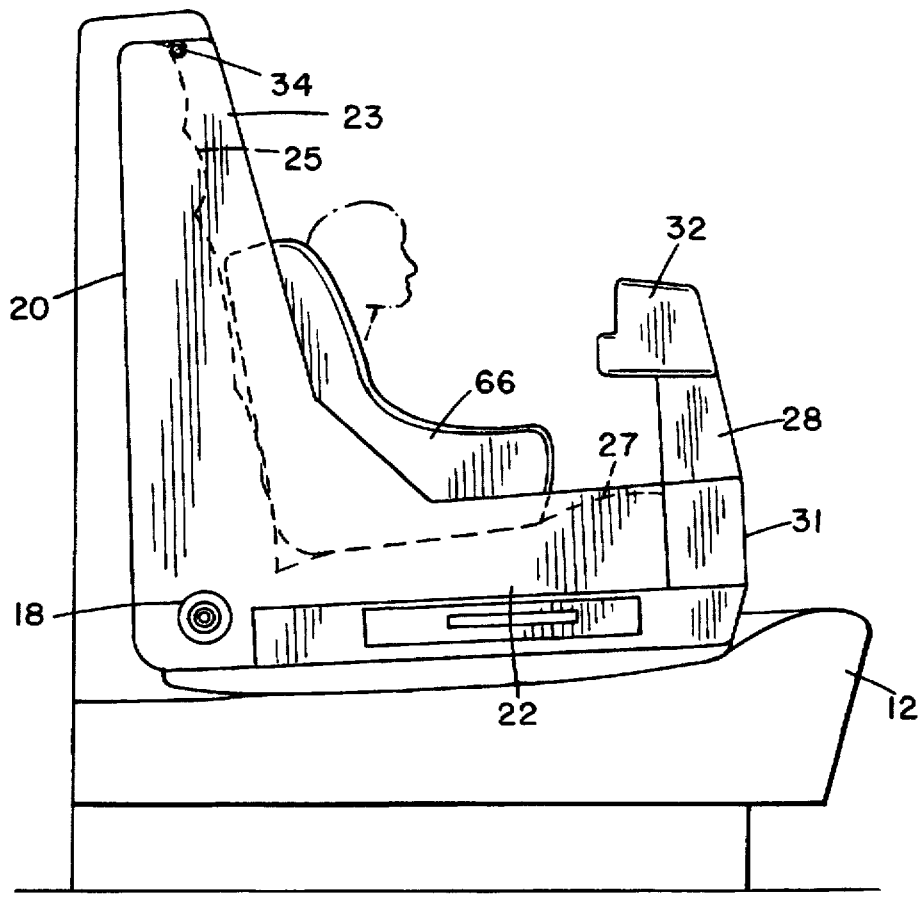
FIG. 7 is a side elevation view of the safety seat showing an infant seat insert.

A slide-out removeable drawer 82 is also provided in the bottom portion 22 of the vehicle seat, as best illustrated in FIGS. 1 and 6. This drawer may be used to store bottles, snacks or other items where they will be easily accessible without cluttering the rear seat of the vehicle. The drawer 82 may be designed as a cooler compartment via suitable, so-called blue ice packs or the like (not illustrated), and will have a suitable handle 83 for easy opening and closing of the drawer.

The child safety seat 10 is of relatively simple, inexpensive construction and may be readily installed in any vehicle during manufacture. It is designed for connection into a standard vehicle air bag safety system, so that the safety seat air bag will not be deployed unless an actual impact is detected. The seat is easily deployable when needed, yet can be stored out of the way conveniently when not in use, without preventing use of any part of the vehicle rear seat. The safety seat 10 will allow infants and small children to be transported with considerably more safety and with the added advantage of an in-built air bag. The seat also has convenient storage facilities for snacks, toys, diapers and the like.

Although a preferred embodiment of the invention has been described above by way of example only, it will be understood by those skilled in the field that modifications may be made to the disclosed embodiment without departing from the scope of the invention, which is defined by the appended claims.

We claim:

1. A child safety seat, comprising:

a seat frame having a seat portion and a backrest portion;

pivot means projecting from the seat frame for pivotally securing the seat frame in a cut-out in the backrest of a vehicle seat for movement between an upright deployed position and a rearwardly retracted position, the backrest portion being adapted to be flush with the vehicle seat backrest in the upright, deployed position and to project to the rear of the vehicle seat in the rearwardly retracted position, the seat portion being adapted to be flush with the vehicle seat backrest in the rearwardly retracted position;

the seat portion having a forward end, an upright column projecting upwardly from the forward end of the seat portion, the column having a housing at an upper end with an opening facing towards the backrest portion of the seat, a lid normally covering said opening, an inflatable air bag mounted in said housing facing said opening for extending out of said opening to restrain an occupant of the seat when inflated, and an air bag actuator device for inflating said air bag;

electrical connector means extending from said air bag actuator device through said seat frame for connection to the trigger circuit of a vehicle air bag system, so that the child seat air bag is deployed whenever the vehicle driver side air bag is deployed; and tubing extending from the air bag actuator device through the column and seat frame out of the seat frame for carrying said electrical connector means.

2. The assembly as claimed in claim 1, wherein the air bag is shaped and dimensioned so that it will not cover the face of a child in the safety seat when inflated.

3. The assembly as claimed in claim 1, wherein the column is releasably mounted on the seat frame for movement between a vertical extended position spaced forwardly from the seat portion of the seat and a vertical retracted position engaged with the seat portion, the column and seat portion having an interengageable latching mechanism for releasably locking the column in the retracted position.

4. The assembly claimed in claim 1, including a removable infant seat insert for selectively securing to the seat frame to carry small infants.

5. The assembly claimed in claim 1, wherein the seat portion has an upper surface, a seat cushion on said upper surface, a lower surface, and a cushion on said lower surface which is flush with the vehicle seat backrest cushion when the seat is in the retracted position.

6. A child safety seat comprising:

a seat frame having a seat portion and a backrest portion;

pivot means projecting from the seat frame for pivotally securing the seat frame in a cut-out in the backrest of a vehicle seat for movement between an upright deployed position and a rearwardly retracted position, the backrest portion being adapted to be flush with the vehicle seat backrest in the upright, deployed position and to project to the rear of the vehicle seat in the rearwardly retracted position, the seat portion being adapted to be flush with the vehicle seat backrest in the rearwardly retracted position;

the seat portion having a forward end, an upright column projecting upwardly from the forward end of the seat portion, the column having a housing at an upper end with an opening facing towards the backrest portion of the seat, a lid normally covering said opening, an inflatable air bag mounted in said housing facing said opening for extending out of said opening to restrain an occupant of the seat when inflated, and an air bag actuator device for inflating said air bag;

electrical connector means extending from said air bag actuator device through said seat frame for connection to the trigger circuit of a vehicle air bag system, so that the child seat air bag is deployed whenever the vehicle driver side air bag is deployed; and said backrest portion having an upper end, a cover flap pivotally mounted on the upper end of the backrest portion for pivoting between an open position inclined upwardly from the upper end of the backrest portion and a closed position covering the upper end of the seat, the flap being adapted to be flush with the upper end of a vehicle seat backrest in the closed position, and securing means for releasably securing the cover flap to a vehicle rear window in the open position.

7. The seat as claimed in claim 6, wherein the cover flap has an inner face having a plurality of pockets for carrying child accessories.

8. The assembly as claimed in claim 1, including a removable drawer slidably in the seat portion of the seat frame for carrying accessories.

9. The assembly as claimed in claim 1, wherein the column has an built-in TV set facing an occupant of the safety seat.

* * * * *